Patented Aug. 26, 1930

1,774,324

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

COMPOSITE PRODUCT AND METHOD OF MAKING SAME

No Drawing.    Application filed April 22, 1927. Serial No. 185,919.

This invention relates to a composite product constructed of two or more bodies of the same or different materials integrally united by a strong bonding film, and to methods of producing such composite products.

The present invention is based on the discovery that the reaction products of a vegetable oil and certain compounds are capable, when manipulated in the manner hereinafter described, of forming strong bonds between solid materials of all kinds, particularly metals, rubber, leather, fabric and wood.

Briefly, the invention is carried out in the following manner: an oil, such as tung oil, linseed oil, castor oil or rosin oil, is admixed with one or more of a class of compounds, comprising strong inorganic non-oxidizing acids and compounds capable of undergoing thermal or hydrolytic dissociation to form such acids, and the ingredients of the admixture permitted to react by standing, which reaction may, however, be hastened by warming on a steam bath for several hours, or until the reaction is complete. The materials are prepared for the desired composite product and the surfaces to be bonded are coated with a film of the reaction mixture and the assemblage is then subjected to heat and pressure. A strong, integrally-constructed composite product results.

In order to illustrate in greater detail this process, the following examples are herein given.

*Example 1.*—To 100 parts by weight of tung oil, 6 parts of sulfuric acid (sp. gr. 1.84) were added slowly with stirring, and the mix permitted to stand for 24 hours. The sandblasted surface of a steel plate was coated with the reaction mixture and a strip of fabric frictioned with a vulcanizable rubber composition was pressed thereagainst and heated to a vulcanizing temperature. The composite product thus formed possessed high resistance to the separation of its composite parts. It will be understood that a higher or lower percentage of the acid may be employed in the formation of the reaction product, but the amount herein specified is satisfactory and is adapted for economical operation of the process. Further, the tung oil of the above example may be replaced by other vegetable oils, such as linseed oil, castor oil or rosin oil.

*Example 2.*—As a further example, 100 parts by weight of tung oil were admixed with 50 parts of phosphorus oxychloride, and the admixture heated for 24 hours at 110° C. The reaction mixture was spread upon the cleansed surface of a steel plate and a rubber frictioned fabric pressed thereagainst and cured as in the preceding example. The resulting composite product had its component parts strongly bound together into a durable integral unit, the strength of the bond being approximately ten times that obtainable with the best rubber cements. A large number of other substances falling in the above indicated class, namely, strong inorganic acids and compounds capable of undergoing thermal and hydrolytic dissociation to form such acids, have been employed in building constructions similar to those described in the above examples. Such substances include hydrochloric acid, hydrobromic acid, sulfuric acid, phosphoric acid, cupric chloride, mercuric chloride, aluminum chloride, antimony trichloride, phosphorus trichloride, phosphorous oxychloride, sulfur chloride, benzo trichloride, trichloracetic acid, antimony tribromide, ferrous bromide, cupric bromide, cupric iodide, stannous sulfate, ferrous sulfate, aluminum sulfate, and the like.

It is to be understood that composite products constructed of materials other than steel and rubber, which materials have been described in the above example because of the recognized difficulty of making composite products of these materials, may be produced by the above indicated processes. Thus, composite products comprising leather, fabric, wood, earthenware and hydraulic cements may be constructed by interposing a layer of any of the reaction products hereinabove described and submitting the assembled product to pressure and preferably to heat in order to facilitate the setting of bonding layer.

It is to be understood that fillers, pigments, and other ingredients may be added to the reaction products hereinabove described before they are incorporated in the composite product and that various other modifications in the process and product may be made without departing from the principles of this invention.

I claim:

1. The method of making composite products which comprises coating at least one of the surfaces of the bodies to be joined with a material composed at least in part of the reaction product of an oil and a substance selected from the group comprising strong inorganic non-oxidizing acids and compounds capable of undergoing thermal or hydrolytic dissociation to form such acids, juxtaposing the bodies with the surfaces to be joined including the coated surfaces in contact, and subjecting the assemblage to pressure.

2. The method of making composite products from two or more separate bodies which comprises interposing between the surfaces of the bodies to be joined a film of a material composed at least in part of the reaction product of a vegetable oil and a substance selected from the group comprising strong inorganic non-oxidizing acids and compounds capable of undergoing thermal or hydrolytic dissociation to form such acids, and subjecting the assemblage under pressure to elevated temperatures.

3. The method of bonding rubber to metal which comprises coating the metal surface with a film containing a reaction product of an unsaturated vegetable oil and a substance selected from a class comprising strong inorganic non-oxidizing acids and compounds capable of undergoing thermal or hydrolytic dissociation to form such acids, superposing thereon a rubber composition, and subjecting the assemblage under pressure to elevated temperatures.

4. The method of bonding rubber to metal which comprises coating the metal surface with a film containing a reaction product of tung oil, and a substance selected from a class comprising strong inorganic non-oxidizing acids and compounds capable of undergoing thermal or hydrolytic dissociation to form such acids, superposing thereon a rubber composition, and subjecting the assemblage under pressure to elevated temperatures.

5. The method of bonding rubber to metal which comprises coating the metal surface with a film containing a reaction product of sulfuric acid and a substance selected from a class comprising tung oil, linseed oil, castor oil and rosin oil, superposing thereon a rubber composition and subjecting the assemblage under pressure to elevated temperatures.

6. The method of bonding rubber to metal which comprises coating the metal surface with a film containing a reaction product of a substance selected from a class comprising tung oil, linseed oil, castor oil and rosin oil and a substance selected from a class comprising strong inorganic non-oxidizing acids and compounds capable of undergoing thermal or hydrolytic dissociation to form such acids, superposing thereon a rubber composition and subjecting the assemblage under pressure to elevated temperatures.

7. The method of bonding rubber to metal which comprises coating the metal surface with a film containing a reaction product of tung oil and a substance selected from a class comprising strong inorganic non-oxidizing acids and compounds capable of undergoing thermal or hydrolytic dissociation to form such acids, superposing thereon a vulcanizable rubber composition, and vulcanizing the rubber composition in pressure contact with the coated metal.

8. The method of bonding rubber to metal which comprises coating the metal surface with a film containing a reaction product of a substance selected from a class comprising tung oil, linseed oil, castor oil, and rosin oil and a substance selected from a class comprising strong inorganic acids or compounds capable of undergoing thermal or hydrolytic dissociation to form such acids, superposing thereon a vulcanizable rubber composition and vulcanizing the rubber composition in pressure contact with the coated metal.

9. A composite construction including two bodies of material integrally united through the intermediary of a composition comprising the reaction product of an oil and a substance selected from a group comprising strong inorganic non-oxidizing acids and compounds capable of undergoing thermal or hydrolytic dissociation to form such acids.

10. A composite construction including two bodies of material integrally united through the intermediary of a composition comprising the reaction product of a drying vegetable oil and a substance selected from a group comprising strong inorganic non-oxidizing acids and compounds capable of undergoing thermal or hydrolytic dissociation to form such acids.

11. A composite construction including two bodies of material integrally united through the intermediary of a composition comprising the reaction product of a drying vegetable oil and a substance selected from a group comprising strong inorganic non-oxidizing acids and compounds capable of undergoing thermal or hydrolytic dissociation to form such acids.

12. A composite construction including two bodies of material integrally united through the intermediary of a composition comprising the reaction product of a substance selected from a group comprising tung oil, linseed oil, castor oil and rosin oil, and a substance selected from a group comprising strong inorganic non-oxidizing acids and compounds capable of undergoing thermal or hydrolytic dissociation to form such acids.

13. A composite construction including two bodies of material integrally united through the intermediary of a composition comprising the reaction product of a drying vegetable oil and sulfuric acid.

14. A composite construction including two bodies of material integrally united through the intermediary of a composition comprising the reaction product of a substance selected from a group comprising tung oil, linseed oil, castor oil and rosin oil, and sulfuric acid.

15. The method of bonding rubber to metal which comprises coating the metal surface with a film of a reaction product of an oil and a compound capable of undergoing thermal or hydrolytic dissociation to form a strong inorganic non-oxidizing acid, superposing thereon a rubber composition and subjecting the assemblage to vulcanization.

16. The method of bonding rubber to metal which comprises coating an iron or steel surface with a film containing a reaction product of a strong inorganic non-oxidizing acid and a vegetable oil, superposing thereon a vulcanizable rubber composition, and subjecting the assemblage under pressure to elevated temperatures.

17. The method of bonding rubber to metal which comprises coating a clean iron or steel surface with a film containing a reaction product of a strong inorganic non-oxidizing acid and a drying oil, superposing thereon a vulcanizable rubber composition, and vulcanizing the rubber in pressure contact with the coated metal.

18. A composite construction including rubber and metal integrally united through the intermediary of a composition comprising the reaction product of a drying oil and a substance selected from a group comprising strong inorganic non-oxidizing acids and compounds capable of undergoing thermal or hydrolytic dissociation to form such acids.

19. A composite construction including rubber and metal integrally united through the intermediary of a composition comprising the reaction product of a drying oil and a strong inorganic non-oxidizing acid.

20. A composite construction including rubber and metal integrally united through the intermediary of a composition comprising the reaction product of a drying vegetable oil and sulphuric acid.

21. The method of bonding rubber to metal which comprises coating a metal surface with a film containing a reaction product of an unsaturated fatty oil with sulphur chloride, superposing thereon a vulcanizable rubber composition, and subjecting the assemblage under pressure to an elevated temperature.

22. The method of bonding rubber to metal which comprises coating a clean iron or steel surface with a film containing a reaction product of a drying oil with sulphur chloride, superposing thereon a vulcanizable rubber composition, and subjecting the assemblage under pressure to an elevated temperature.

23. A composite construction including rubber and metal integrally united through the intermediary of a composition comprising the reaction product of an unsaturated fatty oil with sulphur chloride.

24. A composite construction including rubber and iron or steel integrally united through the intermediary of a composition comprising the reaction product of a drying oil with sulphur chloride.

In witness whereof I have hereunto set my hand this 20th day of April, 1927.

HAROLD GRAY.